US 8,888,129 B2

(12) United States Patent
Arzanpour et al.

(10) Patent No.: US 8,888,129 B2
(45) Date of Patent: Nov. 18, 2014

(54) INFLATION METHOD AND APPARATUS FOR AN AIRBAG

(75) Inventors: Siamak Arzanpour, Port Coquitlam (CA); Hossein Dehghani, Vancouver (CA)

(73) Assignee: Simon Fraser University, Burnaby (CA)

( * ) Notice: Subject to any disclaimer, the term of this patent is extended or adjusted under 35 U.S.C. 154(b) by 0 days.

(21) Appl. No.: 13/983,003

(22) PCT Filed: Jan. 31, 2012

(86) PCT No.: PCT/CA2012/000101
§ 371 (c)(1),
(2), (4) Date: Oct. 15, 2013

(87) PCT Pub. No.: WO2012/103640
PCT Pub. Date: Aug. 9, 2012

(65) Prior Publication Data
US 2014/0035266 A1 Feb. 6, 2014

Related U.S. Application Data

(60) Provisional application No. 61/437,920, filed on Jan. 31, 2011.

(51) Int. Cl.
*B60R 21/08* (2006.01)
*B60R 21/02* (2006.01)
*A42B 3/04* (2006.01)
*B60R 21/261* (2011.01)

(52) U.S. Cl.
CPC ............. *B60R 21/261* (2013.01); *B60R 21/02* (2013.01); *A42B 3/0486* (2013.01); *B60R 2021/0253* (2013.01)
USPC ........ 280/751; 280/753; 188/372; 296/187.05

(58) Field of Classification Search
CPC ........................................................ B60R 21/08
USPC ...................... 280/742, 751–753; 296/187.05; 188/372
See application file for complete search history.

(56) References Cited

U.S. PATENT DOCUMENTS

| | | | |
|---|---|---|---|
| 6,244,625 B1 * | 6/2001 | Bayer et al. | 280/751 |
| 7,264,271 B2 * | 9/2007 | Barvosa-Carter et al. | 280/751 |
| 7,350,851 B2 * | 4/2008 | Barvosa-Carter et al. | 296/187.02 |
| 7,494,152 B2 * | 2/2009 | Schuler et al. | 280/752 |
| 7,946,614 B2 * | 5/2011 | Breuninger et al. | 280/730.2 |
| 2005/0161921 A1 * | 7/2005 | Higuchi | 280/735 |
| 2010/0314860 A1 * | 12/2010 | Carter et al. | 280/751 |

OTHER PUBLICATIONS

Fukaya et al., "Protection against Impact with the Ground Using Wearable Airbags," *Industrial Health* 46:59-65, 2008.

(Continued)

*Primary Examiner* — James English
(74) *Attorney, Agent, or Firm* — Seed IP Law Group PLLC

(57) ABSTRACT

An airbag device includes an airbag comprising foam bulk at least partially surrounded by a flexible membrane, the airbag compressible from a second volume to a first volume; a locking mechanism for maintaining the airbag compressed to the first volume; a one-way valve openable to deliver air to the airbag when the locking mechanism is released; and wherein when the locking mechanism is released, the airbag expands.

17 Claims, 12 Drawing Sheets

(56) References Cited

OTHER PUBLICATIONS

Shi et al., "Development of a Human Airbag System for Fall Protection Using MEMS Motion Sensing Technology," IEEE/RSJ International Conference on Intelligent Robots and Systems 2006, 4405-4410.

Tamura et al., "A preliminary study to demonstrate the use of an air bag device to prevent fall-related injuries," Proceedings of the 29$^{th}$ Annual International Conference of the IEEE EMBS, Cité Internationale, Lyon, France, Aug. 23-26, 2007, pp. 3833-3835.

* cited by examiner

INFLATION METHOD AND APPARATUS FOR AN AIRBAG

TECHNICAL FIELD

The present application relates to inflatable airbags.

BACKGROUND DISCUSSION

An airbag is a safety device that is used in motor vehicles. Since approximately 1980, airbags have been credited with a reduction in injuries and mortalities related to car accidents. These benefits have motivated researchers to employ airbags in other high risk applications, such as human airbags and inflatable hip protectors, for example, in an effort to prevent injuries. Despite the success of airbags, a number of deleterious effects of airbag deployment have been reported including head and eye injuries, chemical injuries, facial abrasions and lacerations and burns. Even with these detrimental effects, the overwhelming benefit observed with the addition of airbags to vehicles has led to regulations enforcing airbag installation in all vehicles.

Both automotive and human airbags are expensive, complicated and irreversible. These shortcomings restrict applications of airbags to accidents with a lower risk of severe injuries. An improved airbag is therefore desirable.

SUMMARY

In an aspect of the present disclosure there is provided, an airbag device including: an airbag comprising foam bulk at least partially surrounded by a flexible membrane, the airbag compressible from a second volume to a first volume; a locking mechanism for maintaining the airbag compressed to the first volume; a one-way valve openable to deliver air to the airbag when the locking mechanism is released; and wherein when the locking mechanism is released, the airbag expands.

In an aspect of the present disclosure there is provided, an airbag device including: an airbag comprising a flexible membrane defining a cavity, the airbag at least partially surrounded by a foam bulk, the foam bulk being compressible from a second volume to a first volume; a locking mechanism for maintaining the airbag within a container and maintaining the foam bulk compressed to the first volume; a one-way valve openable to deliver air to the bladder when the locking mechanism is released; and wherein when the locking mechanism is released, the airbag and foam bulk expand.

In an aspect of the present disclosure there is provided, an airbag device including: a foam bulk base; a foam bulk cover sized to mate with the foam bulk base to define a cavity, a flexible membrane covering a wall of the cavity, the flexible membrane being impermeable to air; and a support extending between the foam bulk base and the foam bulk cover to couple the foam bulk base to the foam bulk cover; wherein the cavity is sealed in response to impact.

In an aspect of the present disclosure there is provided, an airbag device including: an airbag comprising an opening, a wall of the airbag comprising a flexible membrane, the airbag received in a gap between a base and plate, the base and the plate being coupled to one another by a support; a foam bulk; a one-way valve between the foam bulk and the airbag; wherein the foam bulk is compressed in response to impact and air from the foam bulk inflates the airbag.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present application will now be described, by way of example only, with reference to the attached Figures, wherein.

DETAILED DESCRIPTION

Figure 1:
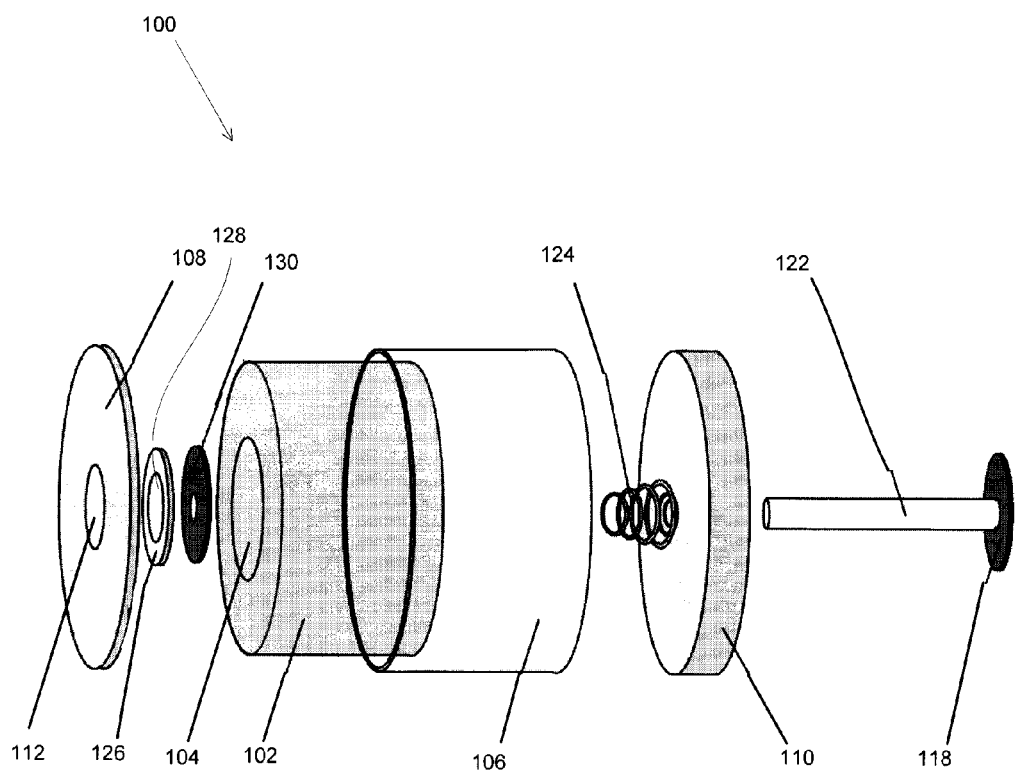
FIG. 1 is schematic exploded view of an airbag device according to an embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, an example embodiment of an airbag device 100 is shown. In this embodiment, the airbag device 100 is for coupling to a protective garment (not shown), such as a hard hat, for example. The airbag device 100 includes a foam bulk 102 that is generally cylindrical in shape having an aperture 104 extending therethrough. The aperture 104 is located generally along a central axis of the foam bulk 102, however, may alternatively be offset from the central axis. The foam bulk 102 is a porous cellular material with a high volume to weight ratio. The foam bulk 102 is an airbag that is compressible from an expanded position to a compressed position. When air is removed from the foam bulk by vacuum or compression, a thin, light, flexible sheet results. Although the foam bulk 102 in the example embodiment is shown as being generally cylindrical, the foam bulk 102 may be cut or molded into any shape.

In general, foam bulk is manufactured using a process that forms gas bubbles in a plastic mixture. Foam bulk 102 may be manufactured using open cell polypropylene, open cell polyethylene, open cell polyurethane, open cell polyamide, open cell melamine or open cell polyolefin, for example, using many different fabrication methods. In addition, cross-linked polyethylene or reticulated polyurethane may be used. Further, the foam bulk 102 may be: anti-static, breathable, conductive, hydrophilic, hydrophobic, neoprene, sponge rubber and/or static dissipative.

The foam bulk 102 may be an existing product that is commercially available or may be a customized product. The foam bulk 102 may be customized to achieve a very low volume to weight ratio, which would result in a small compressed volume.

Figure 2A:
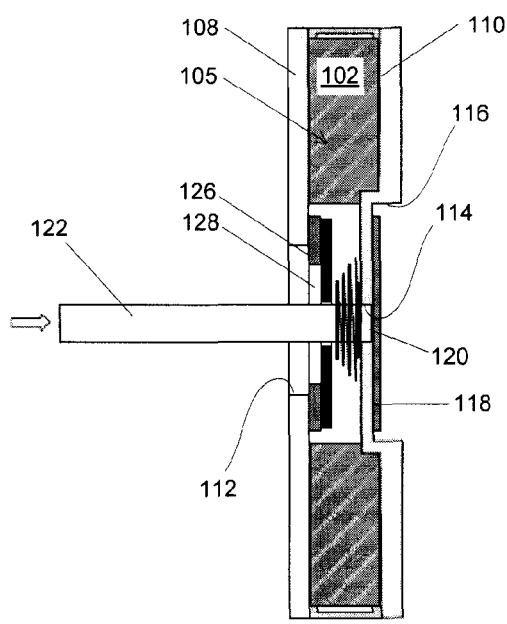
FIG. 2A to 2D are side views partly in section showing deployment of the airbag device of FIG. 1.

Referring also to FIG. 2A, the foam bulk 102 is received in a flexible sleeve 106 to provide an airbag 105, which is disposed between a first plate 108 and a second plate 110. The flexible sleeve 106 is coupled to the first plate 108 and the second plate 110 at opposite ends of the flexible sleeve 106. The flexible sleeve may be any flexible membrane. First plate 108 and second plate 110 include openings 112 and 114, respectively. When the airbag device 100 is assembled, the openings 112, 114 are generally aligned with the aperture 104 of the foam bulk 102 and the first plate 108, second plate 110 and sleeve 106 generally define an enclosure.

The plates 108, 110 are generally thin, solid plates and are made from a rigid material, such as plastic, for example. The sleeve 106 is flexible and generally air tight and may be made from the same material as some prior art airbags. As shown in FIGS. 2A through 2D, a portion of the second plate 110 surrounding the opening 114 may be offset to provide a recess 116 on the side of the second plate 110 that is opposite the first plate 108.

A disk 118 is coupled to an end 120 of a rod 122 that extends through plate openings 112, 114 and foam bulk aperture 104. The disk 118 is received in the recess 116 of the second plate 110 and is made of iron or another magnetic material. The disk 118 may alternatively be a washer that is coupled to the end of the rod by an adhesive or an interference fit, for example.

A spring 124 is received on the rod 122 between the first and second plates 108, 110. An end of the spring 124 is coupled to the second plate 110 so that the spring 124 extends toward the first plate 108. When the foam bulk 102 is compressed, prior to deployment of the airbag device 100, the spring 124 is in a compressed position. The spring 124 is optional and is provided to accelerate the separation of the plates 108, 110 to speed expansion of the foam bulk 102 upon deployment of the airbag device 100.

A permanent magnet 126 is coupled to the first plate 108 between the first and second plates 108, 110. As shown, an aperture 128 of the permanent magnet 126 is larger than a diameter of the rod 122 and smaller than the opening 22. The aperture 128 is sized to provide an air passage between the permanent magnet 126 and the rod 122 to facilitate air flow into the enclosure. The permanent magnet 126 is coupled to the first plate 108 by an adhesive such as glue, for example.

Together, the permanent magnet 126 and disk 118 function as a locking mechanism to maintain the first plate 108 and the second plate 110 in a fixed position relative to one another. The locking mechanism is engaged when the permanent magnet 126 and the disk 118 are moved to within a threshold distance of one another. The threshold distance is sufficiently proximate that the attractive force between the permanent magnet 126 and the disk 118 overcome the expansion force exerted by the compressed foam bulk 102 to pull the permanent magnet 126 and the disk 118 toward one another. As indicated, the locking mechanism has sufficient strength to resist the force of the foam bulk 102 pushing against the plates 108, 110 in an effort to return to the expanded position. The strength of the permanent magnet 126 is therefore selected based on several factors including: type of foam bulk 102 and degree of compression of the foam bulk 102.

A non-magnetic disk 130 is received on the rod 122. An aperture 132 of the non-magnetic disk 130 is sized to allow movement of the non-magnetic disk 130 relative to the rod 122. The non-magnetic disk 130 is made of a light, non-ferrous material such as plastic, for example.

The non-magnetic disk 130 functions as a one-way valve to facilitate air flow into the enclosure when an axial force is applied to the rod 122 and the locking mechanism is released, as shown in FIG. 2A. When the locking mechanism is engaged, spring 124 forces the non-magnetic disk 130 against the permanent magnet 126 to maintain the one-way valve in the closed position. When the locking mechanism is released, expansion of the foam bulk 102 causes a vacuum inside the enclosure, which is relieved by air entering the enclosure. The incoming air forces the non-magnetic disk 130 away from the permanent magnet 126 in order to open an air passage. Again, the spring 124 is optional because even if the one-way valve opens, the foam bulk 102 will not expand until the locking mechanism is released.

Figure 2B:
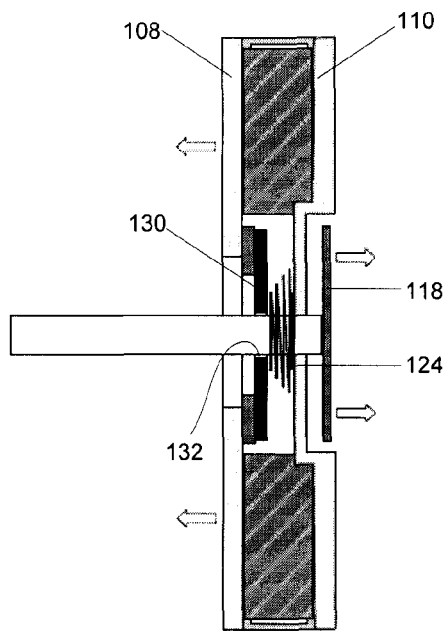
Figure 2C:
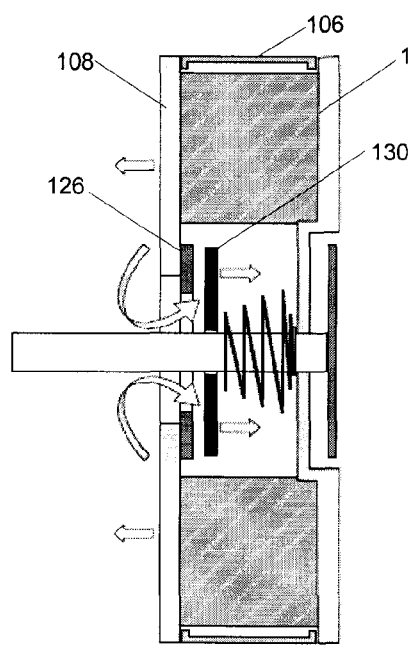
Figure 2D:
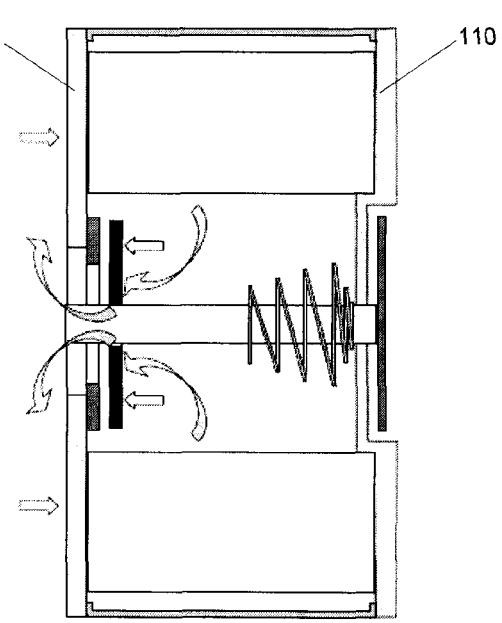

The airbag device 100 is first assembled as shown in FIG. 2D, which shows the foam bulk 102 in an expanded position, occupying a second volume. Air is then removed from the enclosure by using a vacuum pump or by compressing the foam bulk 102 between the first and second plates 108, 110. Once the air has been removed, the airbag device 100 is compressed, as shown in FIG. 2A. Compression of the foam bulk 102 reduces the distance between the plates 108, 110, which facilitates engagement of the locking mechanism. In the compressed position, the foam bulk 102 occupies a first volume that is less than the expanded second volume.

Once the foam bulk 102 has been compressed and the locking mechanism engaged, the airbag device 100 is ready for installation at a deployment location. Example deployment locations for the protective garment example include: a hard hat, a hip protector for persons vulnerable to hip injuries, a knee pad or a shoulder pad, for example. Depending on the type of protective garment, the first plate 108 or the second plate 110 will be fixed at the deployment location. In the hard hat example, when the airbag device 100 is installed, the first plate 110 is fixed to the inside of the hard hat and the rod 122 extends through a hole in the hard hat. The rod 122 is generally directed toward the object that will impact the airbag device 100. In the protective garment examples, the object may be the ground or another surface.

In order to deploy the airbag device 100, the rod 122, which may also be referred to as an impact detector, receives a mechanical impact force, which causes the rod 122 to move toward the airbag device 100, as shown in FIG. 2A. The rod 122 may be replaced by another type of impact detector, which may release the locking mechanism upon receiving a signal. The signal may be mechanical, electrical, hydraulic, pneumatic or another type of signal.

The force applied to the rod 122 is sufficient to overcome the attractive force between the permanent magnet 126 and the disk 118 in order to move the disk 118 away from the permanent magnet 126, as shown in FIG. 2B. This releases the compressive force on the foam bulk 102 and the foam bulk 102 expands toward its original, uncompressed, shape to occupy the second volume. The compressive force on the spring 124 is also released and the spring 124 exerts a force against the first plate 108 as it extends in order to speed expansion of the foam bulk 102. As the foam bulk 102 expands, air outside of the enclosure forces the non-magnetic disk 130 away from the opening 22, compressing spring 124, and flows into the enclosure to equalize the air pressure, as shown in FIG. 2C. This results in rapid suction of air into the enclosure and inflation of the airbag device 100. If the airbag device 100 receives an impact force, the one-way valve limits the flow of air out of the enclosure, as indicated in FIG. 2D, so that the airbag device 100 is able to provide a cushion during impact without deflating.

Figure 3:
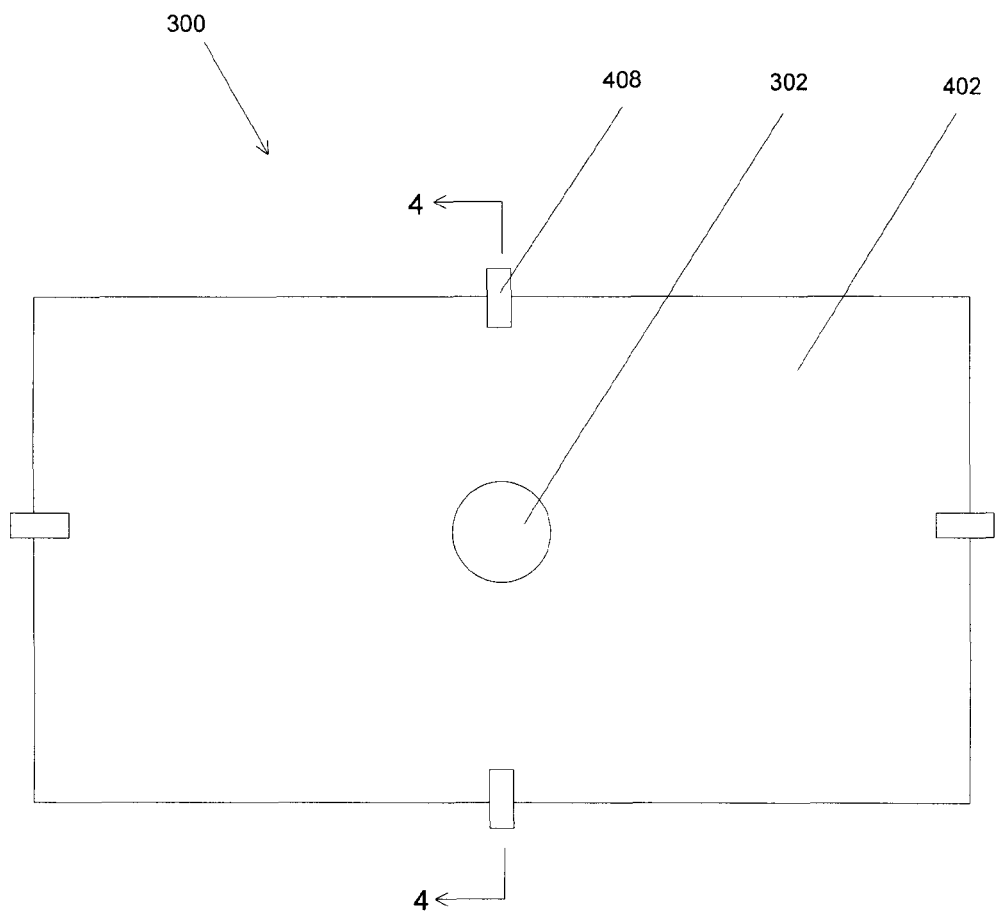
FIG. 3 is a top view of an example airbag device.

Referring to FIG. 3, another example of an airbag device 300 is generally shown. In this embodiment, the airbag device 300 may be installed in a vehicle steering wheel, door interior or vehicle location. The airbag device 300 may alternatively be installed on an outer shell of an aircraft to reduce a landing impact.

Figure 4A:
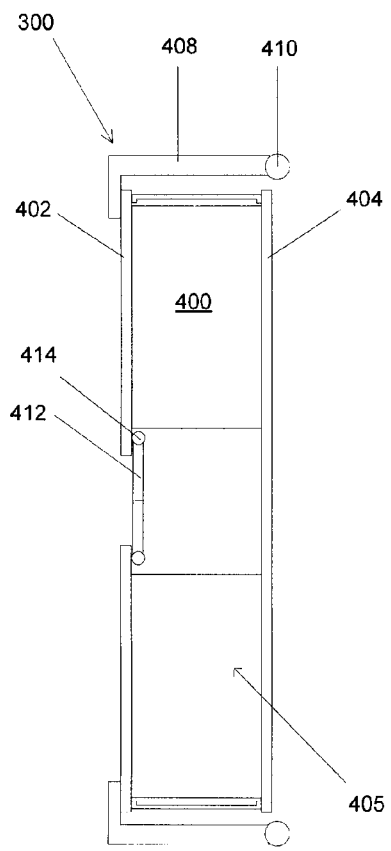
FIGS. 4A and 4B are side sectional views on 4-4 of FIG. 3.
Figure 4B:
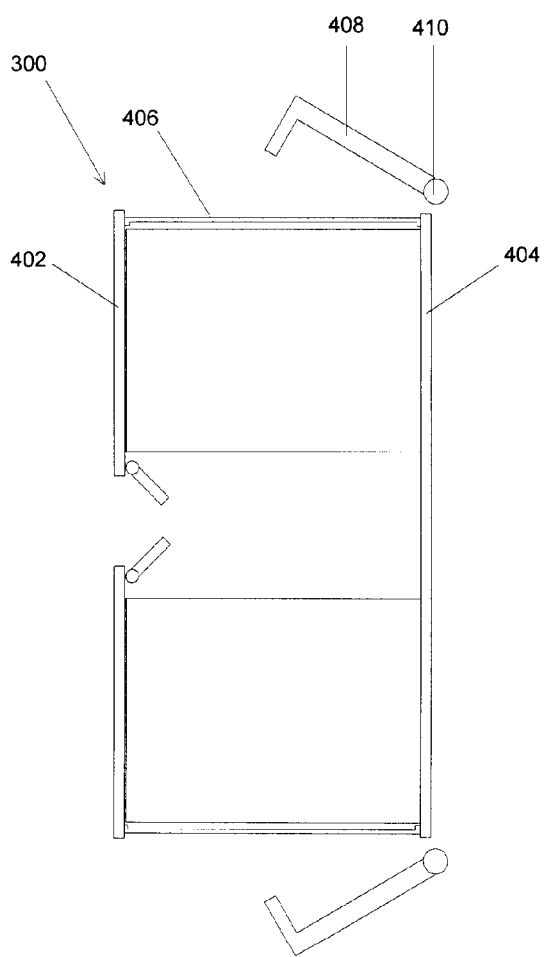

Referring also to FIG. 4A and FIG. 4B, the airbag device 300 is similar in construction to airbag device 100 and includes an airbag 405, which includes a foam bulk 400 received in a flexible sleeve 406, that is compressible between a first plate 402 and a second plate 404. The airbag device 300 further includes a locking mechanism, which includes brackets 408 that are rotatable about pins 410, and a one-way valve, which includes a pair of plates 412 rotatable about hinges 414 to open and block access through opening 302 of first plate 402. An impact detector (not shown) communicates with the locking mechanism to cause the locking mechanism to release. In airbag device 300, the locking mechanism releases by rotating the brackets 408 out of contact with the first plate 402. The impact detector may be an electrical circuit that is in communication with a sensor, such as a proximity sensor or a force sensor, for example. The impact detector receives a signal from the sensor and, in turn, sends a signal to the locking mechanism to release. The one-way valve operates in a similar manner as the locking mechanism of airbag device 100 and is openable by air entering the enclosure. Installation and deployment of the airbag device 300 is similar to installation and deployment of airbag device 100, therefore will not be described further.

Figure 5A:
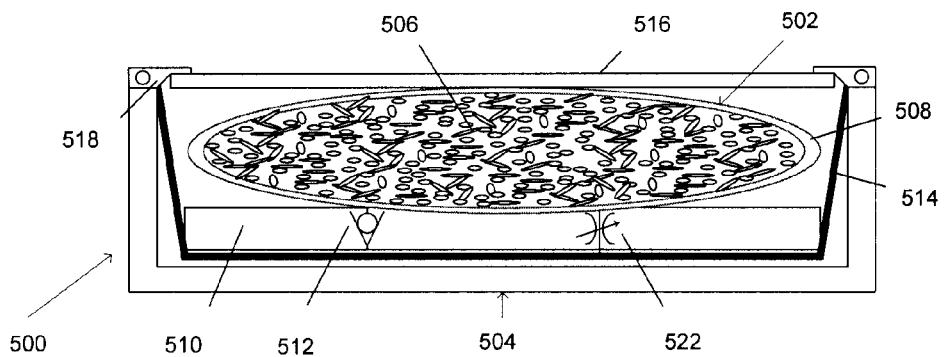
FIG. 5A is a side sectional view of an airbag device according to another embodiment.
Figure 5B:
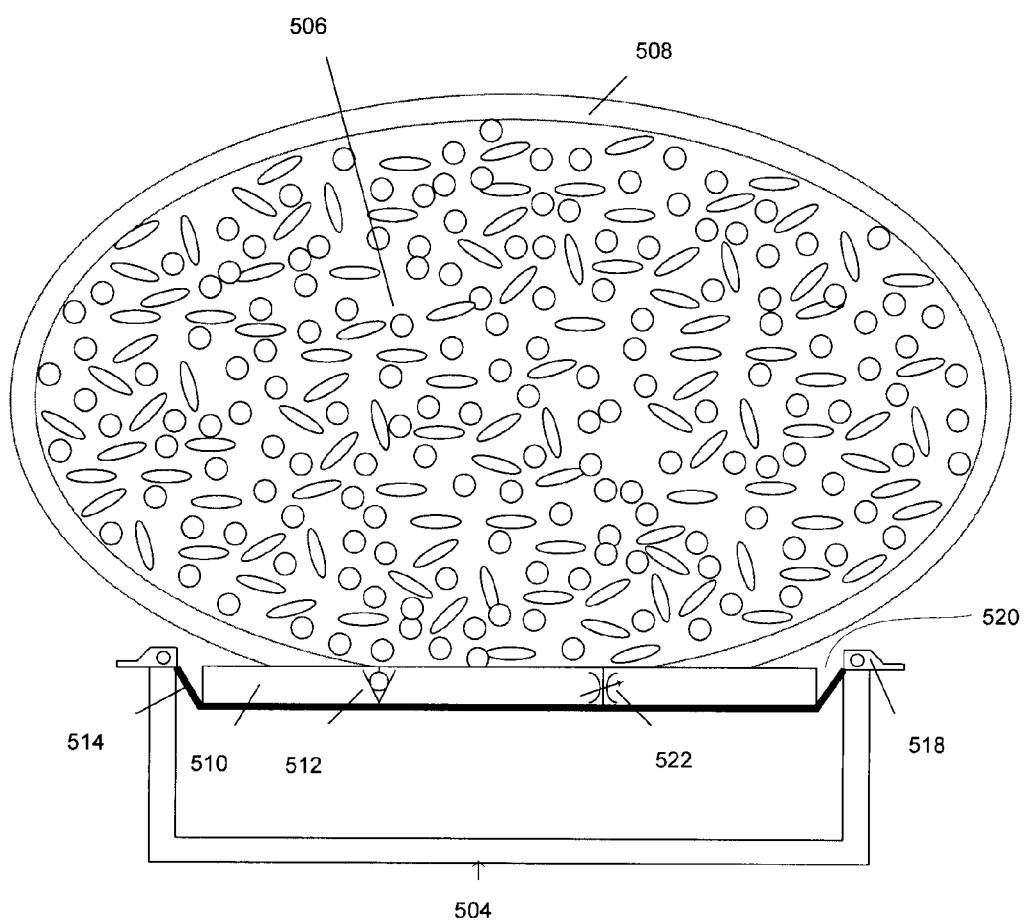
FIG. 5B is a side sectional view of the airbag device of FIG. 5A following deployment.

Referring to FIGS. 5A and 5B, another example of an airbag device 500 for use in vehicular, protective garment or other known airbag application is generally shown.

The airbag device 500 includes an airbag 502 that is received in a container 504. The airbag 502 includes a foam bulk 506 surrounded by a flexible membrane 508. The foam bulk 506 may be entirely surrounded by the flexible membrane 508 or may be partially surrounded thereby. When the foam bulk 506 is partially surrounded, additional damping is provided because it is possible for some air to escape from the airbag 502, which adjusts the stiffness of the airbag 502 and causes energy loss. The flexible membrane 508 may be a flexible fabric, such as nylon, for example, or a flexible coating, such as paint, for example. The airbag 502 is coupled to a plate 510 using an adhesive such as glue, for example, and is in communication with a one-way valve 512 that is mounted in the plate 506. Other means for coupling the airbag 502 to the plate 510 may alternatively be used, as will be apparent to a person skilled in the art.

The container 504 is typically a rigid container, such as a vehicle steering wheel, for example, that is capable housing the airbag 502 A biasing member 514 couples the plate 510 to an interior of the container 504 near an opening 520 thereof. The biasing member 514 is extended when the airbag 502 is fully received in the container 504. The biasing member 514 may be an elastic band, a spring or a linear or rotary actuator, for example.

A cover 516 is coupled to the container 504 by stoppers 518. The cover 516 maintains the plate 510 and the airbag 502, when compressed to a first volume, within the container 504 and maintains the biasing member 514 in the extended position. The stoppers 518 function as a locking mechanism that is releasable when a release signal is received from an impact detector. The impact detector may be a sensory system that is capable of detecting an impact due to a vehicle accident, for example. The stoppers 518 may be released electrically by solenoids, for example, or mechanically in response to a force or an acceleration, for example.

A second valve 522 is mounted in the plate 510. The second valve 522 may be a general purpose on/off, butterfly or needle valve or a solenoid, for example. The second valve 522 may be used to compress the airbag 502 from a second volume, which is shown in FIG. 5B to a first volume, which is shown in FIG. 5A following deployment of the airbag 500.

In operation, the airbag device 500 is deployed by releasing the stoppers 518 when a signal is received by the impact detector. When the stoppers 518 are released, the force exerted by the cover 516 on the airbag 502 is removed allowing the biasing member 514 to return to a non-extended state. The retraction of the biasing member 514 causes the plate 510 and airbag 502 to move out of the container 504 through the opening 520 forcing the cover 516 off of the container 504. Movement of the plate 510 out of the container 504 provides space for the airbag 502 to expand. Air enters the airbag 502 through the one-way valve 512 until the airbag 502 occupies a second volume, as shown in FIG. 5B.

The second valve 522 is maintained in a closed position during deployment of the airbag device 500 and is opened to re-compress the airbag 502 and prepare the airbag device 500 for re-use. The airbag 502 may be squeezed, rolled or folded in order to force air out of the second valve 522 and compress the airbag 502 to the first volume. Alternatively, The second valve 522 may be connected to a vacuum to remove air from the airbag 502. The plate 510 and airbag 502 may then be forced into the container 504, causing the biasing member 514 to extend, and the cover 516 may be replaced. The stoppers 518 may then be engaged to lock the cover 516 on the container 504.

Figure 6A:
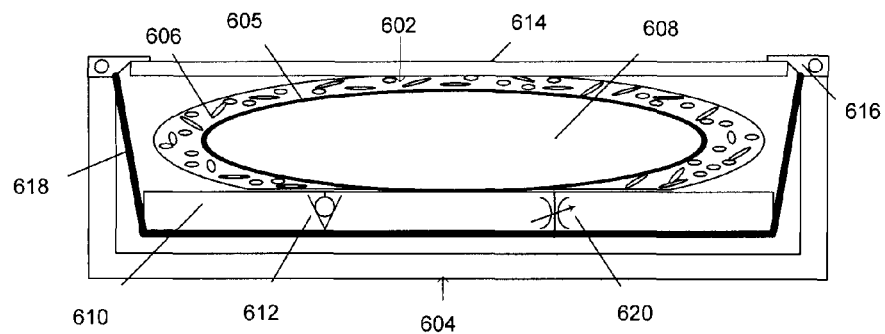
FIG. 6A is a side sectional view of an airbag device according to yet another embodiment.
Figure 6B:
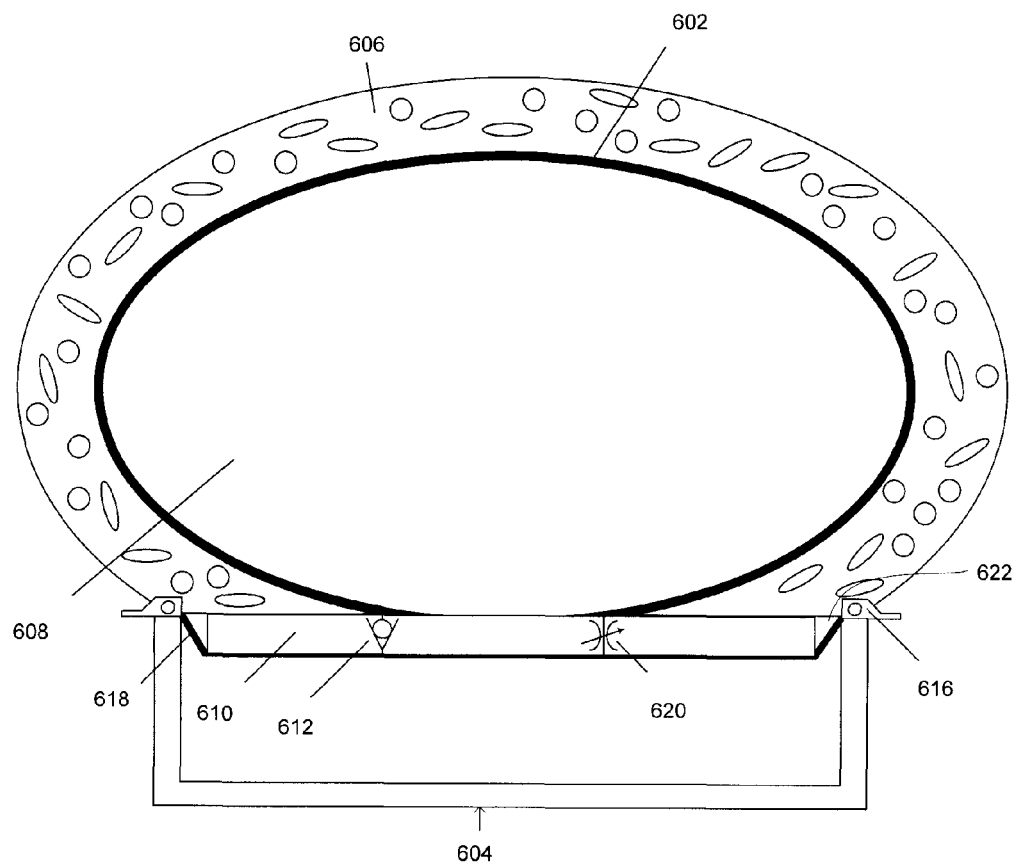
FIG. 6B is a side sectional view of the airbag device of FIG. 6A following deployment.

Referring to FIGS. 6A and 6B, another example of an airbag device 600 for use in vehicular, protective garment or other known airbag application is generally shown.

The airbag device 600 is received in a container 604 and includes an airbag 602. The airbag 602 may be formed by coating an inside of a foam bulk 606 with a flexible membrane 605 that generally encloses a cavity 608. The flexible membrane may be a flexible fabric 605, such as nylon, for example, or a flexible coating, such as paint or latex, for example. The cavity 608 may be entirely defined by the foam bulk 606 or may be partially surrounded thereby.

The airbag 602 is coupled to a plate 610 by an adhesive, such as glue, for example, or by another coupling method. The airbag 602 is in communication with a one-way valve 612 that is mounted in the plate 610 similar to the airbag device 500 of FIGS. 5A and 5B. The airbag device 600 further includes a biasing member 618, second valve 620 and a cover 614 that is coupled to the container 604 by stoppers 616. The biasing member 618 may be an elastic band or another device having spring-like properties.

Similar to the airbag device 500, in operation, the airbag device 600 is deployed from the position of FIG. 6A by releasing the stoppers 616 when a signal is received by an impact detector. When the stoppers 616 are released, the force exerted by the cover 614 on the airbag 602 is removed allowing the biasing member 618 to return to a non-extended state. The retraction of the biasing member 618 causes the plate 610 and airbag 602 to move out of the container 604 through opening 622 of the container 604 forcing the cover 614 off of the container 604. Movement of the plate 610 out of the container 604 provides space for the airbag 602 to expand. Air enters the airbag 602 through the one-way valve 612 until the airbag 602 occupies a second volume, as shown in FIG. 6B.

Figure 7A:
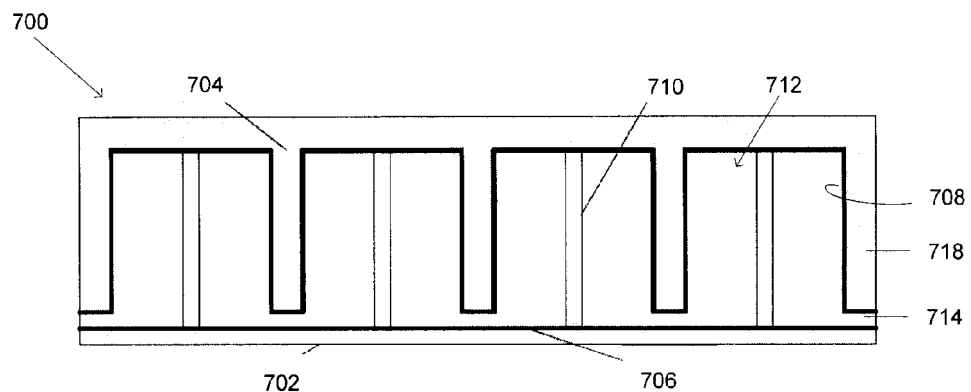
FIG. 7A is a side sectional view of an airbag according to still another embodiment.
Figure 7B:
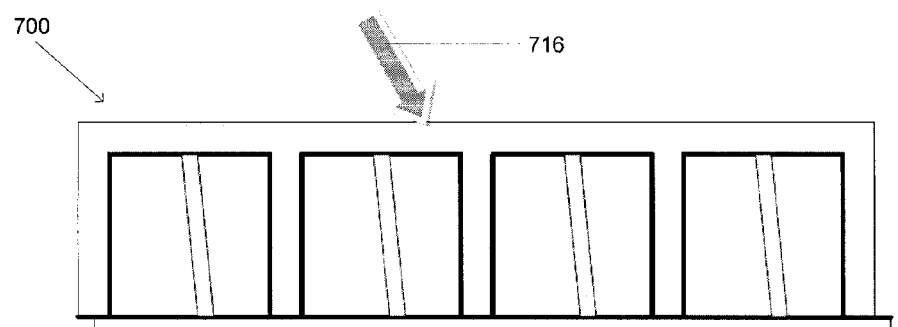
FIG. 7B is a side sectional view of the airbag of FIG. 7A when a force is applied.
Figure 7C:
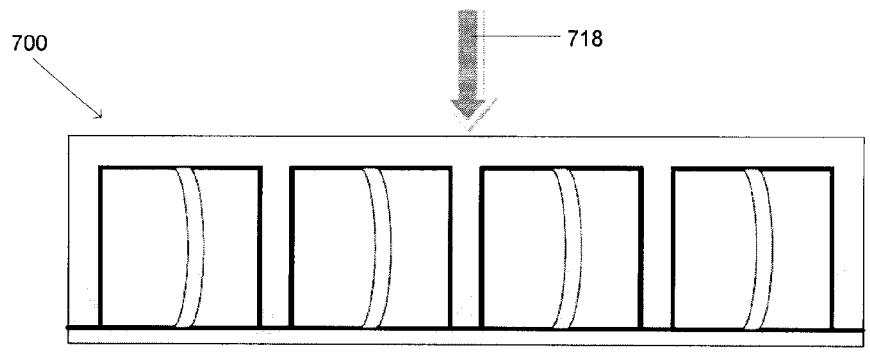
FIG. 7C is another side sectional view of the airbag of FIG. 7A when a force is applied thereto.

Referring to FIGS. 7A, 7B and 7C, another example of an airbag 700 for use in vehicular, protective garment or other known airbag application is generally shown.

The airbag 700 includes a first plate 702 and a second plate 704 that is sized to mate with the first plate 702. Both the first plate 702 and the second plate 704 are made from foam bulk. An inner surface of the first plate 702 is covered by a flexible membrane 706. Similarly, an inner surface of the second plate 704 is covered by a flexible membrane 708. The flexible membranes 706, 708 may be flexible fabrics, such as nylon, for example, or flexible coatings, such as paint or latex, for example. The flexible membranes 706, 708 are air-tight so that air is not able to permeate through the flexible membranes 706, 708.

The second plate 704 is coupled to the first plate 702 by supports 710 by an adhesive, such as glue, for example, or another suitable coupling means. The supports 710 are also made of foam bulk and have some flexibility when an axial force is applied thereto.

A cavity 712 is defined by the inner surfaces of the first plate 702 and the second plate 704. Openings 714 of the cavity 712 are provided when the first plate 702 and the second plate 704 are in a first position relative to one another.

As shown in FIGS. 7B and 7C when a force, the direction of which is indicated by arrows 716 and 718, is imparted on the airbag 700, the supports 710 deflect, buckle or deform and the second plate 704 moves into contact with the first plate 702 causing the openings 714 to close. The cavity 712 is then sealed in a second position so that air cannot escape through the openings 714 or through the flexible membranes 706, 708. The sealed airbag 700 is then able to cushion the impact of the applied force.

Figure 8A:
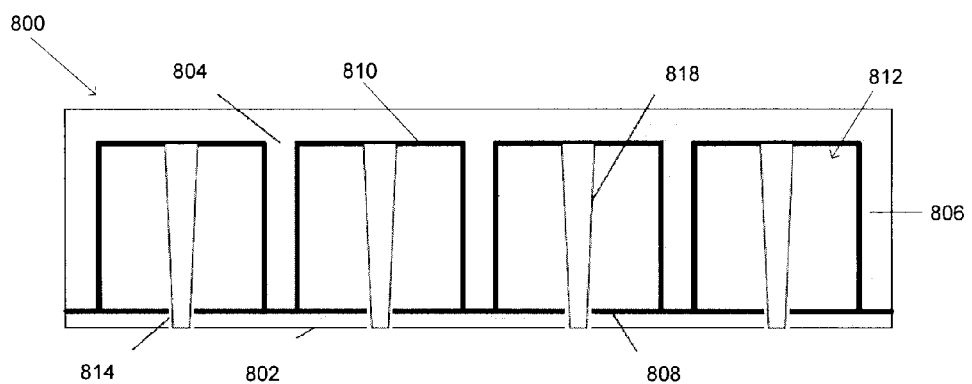
FIG. 8A is a side sectional view of an airbag according to another embodiment.
Figure 8B:
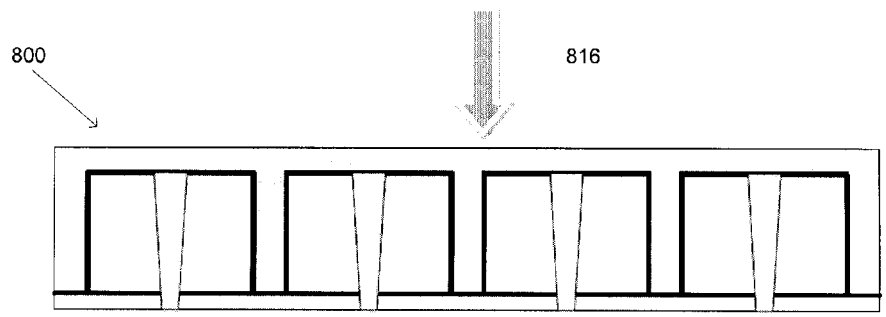
FIG. 8B is a side sectional view of the airbag of FIG. 8A when a force is applied thereto.

Referring to FIGS. 8A and 8B, another example of an airbag 800 for use in vehicular, protective garment or other known airbag application is generally shown.

Similar to the embodiment of FIGS. 7A to 7C, the airbag 800 includes a first plate 802 that is coupled to a second plate 804 by supports 806. Sealing members 818 extend from the second plate 804 toward the first plate 802. A diameter of the sealing members 808 tapers from the second plate 804 to the first plate 802. Inner surfaces of the first plate 802 and second plate 804 are covered by flexible membranes 808 and 810, respectively. A cavity 812 is defined by the inner surfaces of the first plate 802 and the second plate 804. Openings 814 of the cavity 812 are provided when the first plate 802 and the second plate 804 are in a first position relative to one another.

As shown in FIG. 8B, when a force, the direction of which is indicated by arrow 816, is imparted on the airbag 800, the sealing members 818 move into contact with the first plate 702 to plug the openings 814. Because of the taper of the sealing members 818, the cavity 812 is then sealed in a second position so that air cannot escape through the openings 814 or through the flexible membranes 808, 810. The sealed airbag 800 is then able to cushion the impact of the applied force.

Figure 9A:
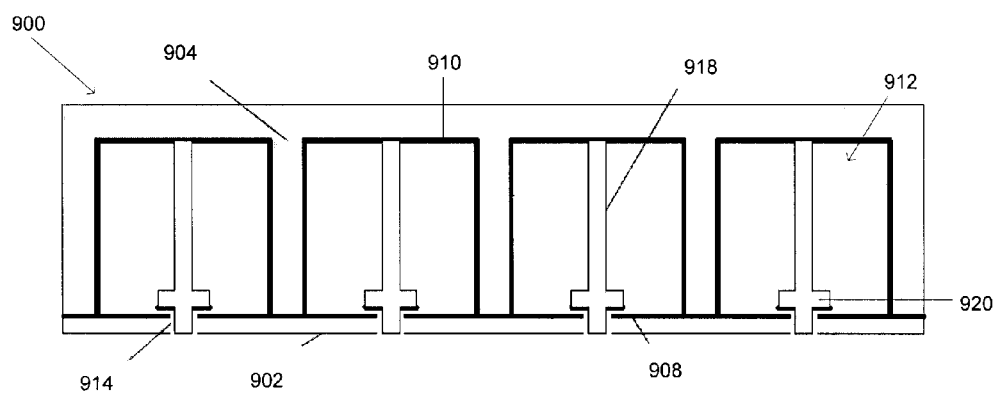
FIG. 9A is a side sectional view of an airbag according to another embodiment.
Figure 9B:
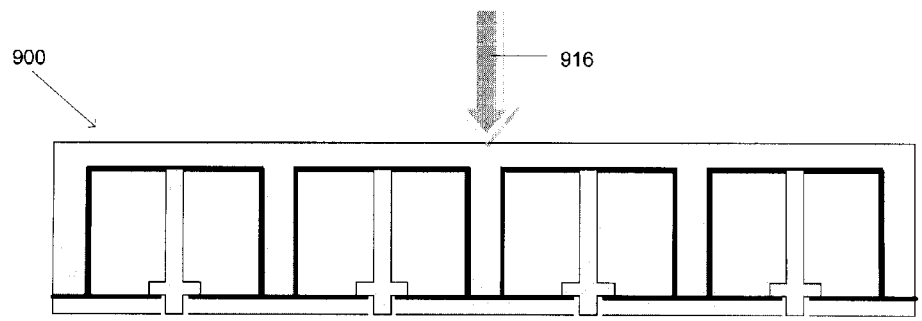
FIG. 9B is a side sectional view of the airbag of FIG. 9A when a force is applied thereto.

Referring to FIGS. 9A and 9B, another example of an airbag 900 for use in vehicular, protective garment or other known airbag application is generally shown.

The airbag 900 is similar to the airbag 800 of the embodiment of FIGS. 8A and 8B, however, rather than being tapered, sealing members 918, which extend from the second plate 904, include a flange 920 that extends outwardly therefrom.

As shown in FIG. 9B, when a force, the direction of which is indicated by arrow 916, is imparted on the airbag 900, the flanges 920 of the sealing members 918 move into contact with first plate 902 to seal openings 914. A cavity 912 is then sealed in a second position so that air cannot escape through the openings 914 or through flexible membranes 908, 910. The sealed airbag 900 is then able to cushion the impact of the applied force.

Figure 10A:
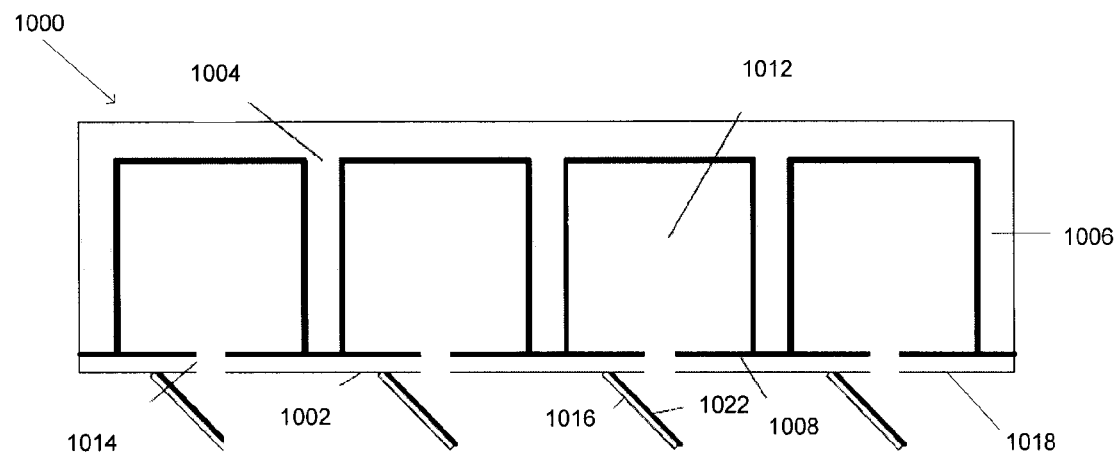
FIG. 10A is a side sectional view of an airbag according to another embodiment.
Figure 10B:
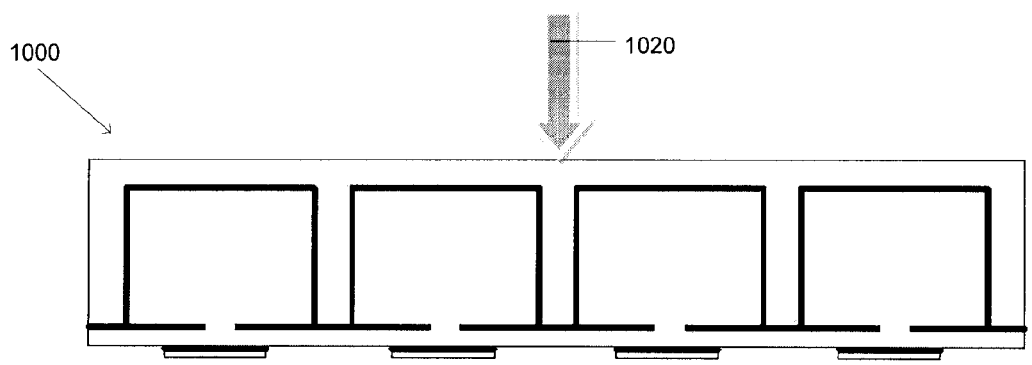
FIG. 10B is a side sectional view of the airbag of FIG. 10A when a force is applied thereto.

Referring to FIGS. 10A and 10B, another example of an airbag 1000 for use in vehicular, protective garment or other known airbag application is generally shown.

This embodiment is similar to the embodiments of FIGS. 8A and 8B and FIGS. 9A and 9B. The airbag 1000 includes a first plate 1002 that is coupled to a second plate 1004 by supports 1006. Inner surfaces of the first plate 1002 and second plate 1004 are covered by flexible membranes 1008 and 1010, respectively. A cavity 1012 is defined by the inner surfaces of the first plate 1002 and the second plate 1004. Openings 1014 of the cavity 1012 are selectively selectively closable by caps 1016, which are made of foam bulk and include a flexible membrane 1022. As shown, the caps 1016 are coupled to an outer surface 1018 of the first plate 1002.

As shown in FIG. 10B, when a force, the direction of which is indicated by arrow 1020, is imparted on the airbag 1000, the contact between the caps 1016 and a surface of impact, such as the ground, for example, when the airbag is part of a protective garment, causes the caps 1016 move toward the closed position. The cavity 1012 is then sealed so that air cannot escape through the openings 1014 or through the flexible membranes 1008, 1010. The sealed airbag 1000 is then able to cushion the impact of the applied force.

Figure 11A:
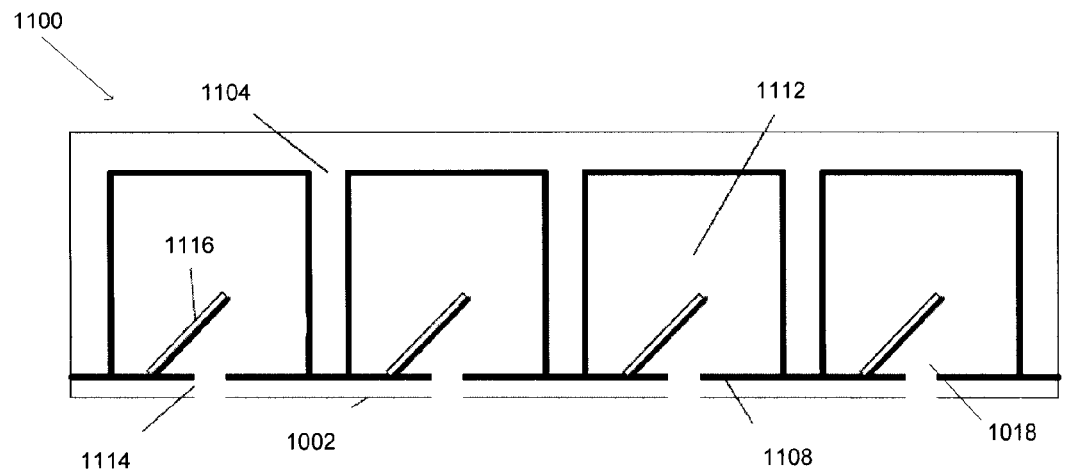
FIG. 11A is a side sectional view of an airbag according to another embodiment.
Figure 11B:
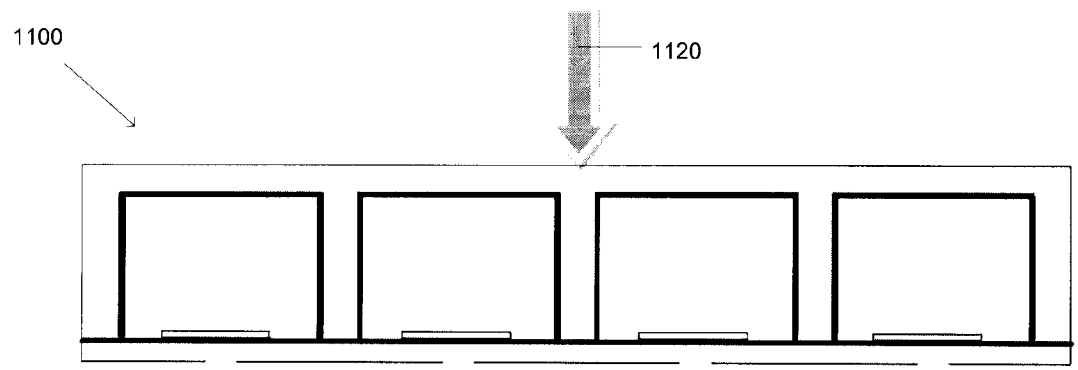
FIG. 11B is a side sectional view of the airbag of FIG. 11A when a force is applied thereto.

Referring to FIGS. 11A and 11B, another embodiment of an airbag 1100, which is similar to airbag 1000 of FIGS. 10A and 10B is shown. In this embodiment, caps 1116 are coupled to an inner surface of flexible membrane 1108 of first plate 1102. When a force, the direction of which is indicated by arrow 1120, is imparted on the airbag 1100, the caps 1116 move toward the closed position. The cavity 1112 is then sealed so that air cannot escape through openings 1114 or through the flexible membranes 1108, 1110. The sealed airbag 1100 is then able to cushion the impact of the applied force.

The airbags of FIGS. 7A to 11B may be housed in a container in a similar manner as shown in the embodiments of FIGS. 5A to 6B. The airbags 700, 800, 900, 1000 and 1100 are shown in their deployed states. Prior to deployment, the airbags 700, 800, 900, 1000 and 1100 may be compacted to occupy a smaller volume and received in a container. Alternatively, another arrangement having a locking mechanism that is capable of maintaining the airbags in a reduced volume state may be used.

Figure 12A:
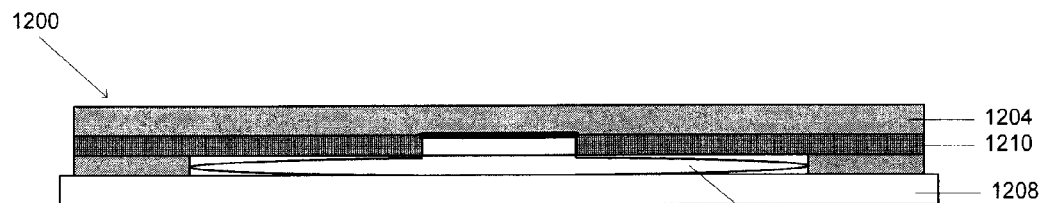
FIG. 12A is a side sectional view of an airbag device according to another embodiment in a first position.
Figure 12B:
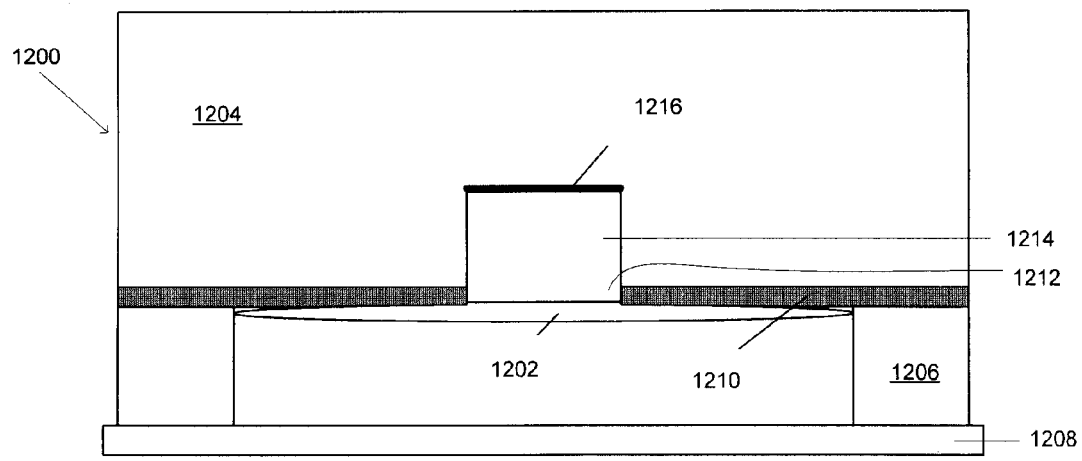
FIG. 12B is a side sectional view of the airbag device of FIG. 12A in a second position.
Figure 12C:
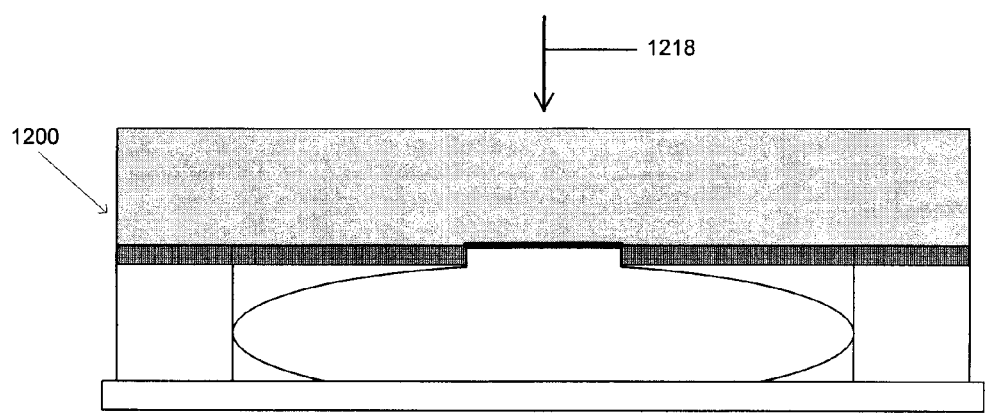
FIG. 12C is a side sectional view of the airbag device of FIG. 12A when a force is applied thereto.

Referring to FIGS. 12A, 12B and 12C, another example of an device airbag 1200 for use in vehicular, protective garment or other known airbag application is generally shown.

The airbag device 1200 includes a bladder 1202 that is defined by a flexible membrane and inflatable using a foam bulk 1204. The airbag device 1200 is expandable from a first position, which is shown in FIG. 12A in which the airbag device 1200 is locked in a container or other housing that causes the foam bulk 1204 to occupy a first volume, to a second position, which is shown in FIG. 12B in which the foam bulk 1204 is expanded to occupy a second volume. Any of the embodiments of FIGS. 1 to 5B may be used maintain the foam bulk 1204 in a compressed position until a locking mechanism is released may be used.

Supports 1206, which are also made of foam bulk and compressible, are coupled between a first plate 1208 and a second plate 1210. A cavity between the first plate 1208 and the second plate 1210 is sized for receiving a bladder 1202. An opening 1212 extends through the second plate 1210 and is generally aligned with a recess 1214 that is provided in the foam bulk 1204. A surface 1216 of the foam bulk 1204 is sealed so that air may not pass therethrough. The surface 1216 is sealed by paint or latex, however, other sealing methods may be used. Although only one opening is shown, the bladder 1202 may include more than one opening.

When a force, the direction of which is indicated by arrow 1218, is imparted on the airbag device 1200, the foam bulk 1204 compresses and air is forced into the bladder 1202. The foam bulk 1204 compresses from the second position of FIG. 12B until the sealed surface 1216 fills opening 1212 of the second plate 1210. In this position, no additional air is able to flow between the foam bulk 1204 and the bladder 1202 so that the airbag device 1200 is able to provide a cushion during impact without deflating.

Examples of locking mechanisms, impact detectors and one-way valves have been described herein. It will be appreciated by a person skilled in the art that other types of locking mechanisms, impact detectors and one-way valve arrangements are possible.

The foam-based gas intake airbags and airbag devices described herein may be used in applications in which prior art airbags are currently employed. The airbags use foam bulk as an inflator rather than chemical reaction or compressed air inflators, for example, of the prior art. The airbags may be designed to conform with safety regulations so that the airbags may be used in vehicular and other regulated applications.

Because the foam bulk may be folded or compressed and released generally without experiencing any damage, the airbags and airbag devices are reversible, which may reduce the overall cost because replacement after airbag deployment may be avoided. Because the airbags are reversible and may be re-used, environmental impact may be reduced.

The reduced cost may increase the use of airbags in accident applications where risk of severe injury is reduced, thus increasing the safety of many different activities. Example applications include: compliant floor, bike and motorcycle helmets, vehicle roofs, treadmills, buses and wheelchairs.

Further advantages of the airbags and airbag devices described herein are that a low weight and a low profile may be achieved and the airbags and airbag devices may be manufactured in many different shapes in order to allow the for use in many different applications.

The above-described embodiments are intended to be examples only. Alterations, modifications and variations can be effected to the particular embodiments by those of skill in the art without departing from the scope of the present application, which is defined solely by the claims appended hereto.

What is claimed is:

1. An airbag device comprising:
    an airbag comprising foam bulk at least partially surrounded by a flexible membrane, the foam bulk compressible from a second volume to a first volume;
    a locking mechanism for maintaining the foam bulk compressed to the first volume;
    a one-way valve openable to deliver air to the airbag in response to the locking mechanism being released; and
    wherein when the locking mechanism is released, the airbag expands.

2. The airbag device as claimed in claim 1, wherein the airbag is disposed between a first plate and a second plate and the locking mechanism is coupled to the first plate and the second plate to fix the first plate and the second plate relative to one another when the foam bulk is compressed.

3. The airbag device as claimed in claim 2, wherein the flexible membrane is a flexible sleeve coupled between the first plate and the second plate to define a generally air tight enclosure.

4. The airbag device as claimed in claim 2, wherein a spring is mounted in the enclosure to increase the speed of expansion of the airbag when the locking mechanism is released.

5. The airbag device as claimed in claim 2, comprising an impact detector in communication with the locking mechanism to release the locking mechanism.

6. The airbag device as claimed in claim 1, comprising a second valve for releasing air from the airbag to compress the airbag.

7. The airbag device as claimed in claim 1, comprising a container for receiving the airbag when the airbag is compressed, the container openable by releasing the locking mechanism.

8. An airbag device comprising:
    an airbag comprising a flexible membrane defining a cavity at least partially surrounded by a foam bulk, the airbag being compressible from a second volume to a first volume;
    a locking mechanism for maintaining the airbag within a container and maintaining the airbag compressed to the first volume;
    a one-way valve openable to deliver air to the airbag in response to the locking mechanism being released; and
    wherein when the locking mechanism is released, the airbag expands.

9. The airbag device as claimed in claim 8, comprising a second valve for releasing air from the airbag to compress the airbag.

10. The airbag device as claimed in claim 8, wherein the locking mechanism comprises a cover coupled to the container by stoppers.

11. The airbag device as claimed in claim 8, comprising a plate received within the container, the airbag being coupled to the plate.

12. The airbag device as claimed in claim 11, wherein a biasing member is coupled between an inside of the container and the plate to force the plate out of an opening of the container when a cover of the container is removed.

13. An airbag comprising:
    a foam bulk base;
    a foam bulk cover sized to mate with the foam bulk base to define a cavity, a flexible membrane covering a wall of the cavity, the flexible membrane being impermeable to air; and
    a support extending between the foam bulk base and the foam bulk cover to couple the foam bulk base to the foam bulk cover;
    wherein the cavity is sealed in response to impact.

14. The airbag as claimed in claim 13, wherein the foam bulk cover is movable relative to the foam bulk base between a first position in which the cavity comprises an opening and a second position in which the cavity is sealed, the foam bulk cover being movable in response to impact.

15. An airbag device comprising:
- an airbag comprising a foam bulk coupled to a bladder defined by a flexible membrane, an opening of the bladder being in communication with the foam bulk, the opening extending through a plate separating the foam bulk and the bladder;
- a base coupled to the plate by a support, a cavity between the base and the plate sized for receiving the bladder when inflated;
- wherein when the foam bulk is compressed in response to impact, air from the foam bulk inflates the bladder.

16. The airbag device as claimed in claim 15, wherein the support is made of foam bulk and compressible.

17. The airbag device as claimed in claim 15, wherein the bladder comprises a plurality of openings in communication with the foam bulk.

* * * * *